(12) United States Patent
Pax et al.

(10) Patent No.: US 11,462,878 B2
(45) Date of Patent: Oct. 4, 2022

(54) ALL SOLID HYBRID ARROW FIBER

(71) Applicant: Lawrence Livermore National Security, LLC, Livermore, CA (US)

(72) Inventors: Paul H. Pax, Livermore, CA (US); Diana C. Chen, Fremont, CA (US); Michael J. Messerly, Danville, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 16/881,388

(22) Filed: May 22, 2020

(65) Prior Publication Data

US 2020/0373725 A1    Nov. 26, 2020

Related U.S. Application Data

(60) Provisional application No. 62/851,798, filed on May 23, 2019.

(51) Int. Cl.
*G02B 6/00* (2006.01)
*H01S 3/067* (2006.01)
*G02B 6/02* (2006.01)

(52) U.S. Cl.
CPC ...... *H01S 3/06716* (2013.01); *G02B 6/02395* (2013.01)

(58) Field of Classification Search
CPC .................................................. G02B 6/02395
USPC .......................................................... 385/123
See application file for complete search history.

(56) References Cited

U.S. PATENT DOCUMENTS

| | | | | |
|---|---|---|---|---|
| 8,934,749 B2 * | 1/2015 | Hotoleanu | .......... | H01S 3/08045 385/124 |
| 2002/0061176 A1 * | 5/2002 | Libori | ................ | G02B 6/02233 385/125 |
| 2005/0157998 A1 * | 7/2005 | Dong | .................. | G02B 6/02342 385/126 |
| 2005/0169590 A1 * | 8/2005 | Alkeskjold | .......... | G02B 6/0239 385/123 |
| 2006/0067632 A1 * | 3/2006 | Broeng | .................. | G02B 6/255 385/96 |
| 2007/0009216 A1 | 1/2007 | Russell et al. | | |
| 2007/0237453 A1 * | 10/2007 | Nielsen | .............. | G02B 6/02338 385/28 |
| 2008/0050069 A1 | 2/2008 | Skovgaard et al. | | |

(Continued)

FOREIGN PATENT DOCUMENTS

WO    WO 2015/144181    10/2015

OTHER PUBLICATIONS

Duguay et al, "Antiresonant reflecting optical waveguides in SiO2—Si multilayer structures," Appl. Phys. Lett., vol. 49, No. 1, 1986, pp. 13-15.

(Continued)

*Primary Examiner* — Kaveh C Kianni
(74) *Attorney, Agent, or Firm* — Knobbe, Martens, Olson & Bear, LLP

(57) ABSTRACT

An all solid hybrid waveguiding structure provides large mode area, acceptable losses of the desired core mode and very high losses of the undesired next higher order mode in the core. Embodiments of the waveguide include a hybrid of low index barriers providing confinement by total internal reflection, and further include high index rings that support guided modes only at effective indices different from that of the desired core mode.

16 Claims, 16 Drawing Sheets

(56) References Cited

U.S. PATENT DOCUMENTS

| | | | |
|---|---|---|---|
| 2009/0080469 A1 | 3/2009 | Nikolajsen | |
| 2016/0028206 A1* | 1/2016 | Watanabe | H01S 3/06783 359/341.3 |
| 2016/0245989 A1* | 8/2016 | Suzuki | G02B 6/02319 |
| 2018/0214951 A1* | 8/2018 | Koponen | B23K 26/0853 |
| 2018/0217412 A1* | 8/2018 | Koponen | G02B 6/028 |

OTHER PUBLICATIONS

Jauregui et al., "Optimizing high-power Yb-doped fiber amplifier systems in the presence of transverse mode instabilities," Optics Express, vol. 24, No. 8, 2016, pp. 7879-7892.

Kolyadin et al., "Light transmission in negative curvature hollow core fiber in extremely high material loss region," Optics Express, vol. 21, No. 8, 2013, pp. 9514-9519.

Yin et al, "Integrated ARROW waveguides with hollow cores," Optics Express, vol. 12, No. 12, 2004, pp. 2710-2715.

Zervas et al.,"High Power Fiber Lasers: A Review," IEEE Journal of Selected Topics in Quantum Electronics, vol. 20, No. 5, 2014, 23 pp.

Zervas, "Power Scaling Limits in High Power Fiber Amplifiers due to Transverse Mode Instability, Thermal Lensing, and Fiber Mechanical Reliability," Proc. of SPIE, vol. 10512, Fiber Lasers XV, 2018, pp. 1051205-1 to 1051205-5.

International Search Report and Written Opinion dated Nov. 9, 2020 in Application No. PCT/US2020/034213 in 8 pages.

International Preliminary Report on Patentability dated Nov. 16, 2021 in Application No. PCT/US2020/034213 in 6 pages.

Wei Ding et al., Analytic model for light guidance in single-wall hollow-core anti-resonant fibers, Optics Express, vol. 22, Issue 22, Nov. 3, 2014, pp. 27242-27256.

* cited by examiner

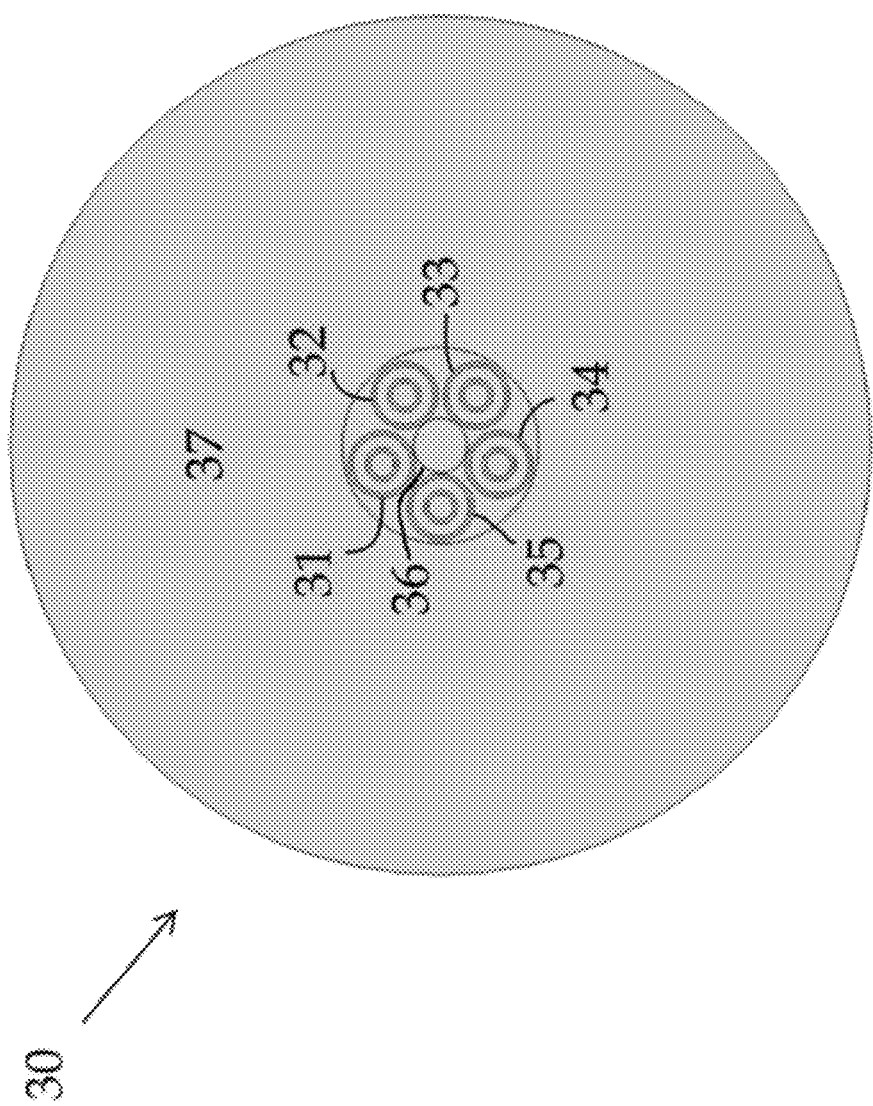

ALL SOLID HYBRID ARROW FIBER

CROSS-REFERENCE TO RELATED APPLICATIONS

This application claims the benefit of U.S. Provisional Patent Application No. 62/851,798 titled "All Solid Hybrid Arrow Fiber," filed May 23, 2019, incorporated herein by reference.

STATEMENT AS TO RIGHT'S TO INVENTIONS MADE UNDER FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC, for the operation of Lawrence Livermore National Laboratory.

BACKGROUND

Field

The present technology relates to waveguide designs, and more specifically, it relates to waveguide designs that increase the threshold for transverse modal instability.

Description of Related Art

High power fiber amplifiers currently face a power limit of a few kilowatts of output due to transverse modal instability (TMI). TMI is caused by a dynamic coupling between the desired mode of the fiber and neighboring higher order modes (HOMs), thought to be mediated by thermal, scattering and population inversion effects. The current thinking is that suppression of the HOMs will result in suppression of TMI and that HOM suppression of about 40 dB/m at operating temperature is sufficient; or greater than 100 dB/m when cold.

FIG. 1A shows a prior art design for hollow optical fibers. This design is known as the negative curvature hollow core fiber. In this configuration, fibers 10 do not support true bound modes in the core 12; light is (imperfectly) confined to the core by rings 14 surrounding it, which comprise an incomplete photonic band gap (PBG) structure. Alternatively, the core confinement has been understood as being due to glancing reflection from the walls of the rings surrounding it, which is enhanced for certain wavelengths by multiple reflections within the wall, via the known anti resonant reflection optical waveguide (ARROW) effect.

While the propagation loss is non-zero, it can be low enough to support guidance over useful distances. These fibers confine light to their cores in multiple modes with shapes similar to true waveguide eigenmodes, except for their intersection with the wall of the rings. Fortuitously, the desired mode has the lowest loss. FIG. 1B shows the loss versus wavelength for the LP01-like mode (lower series of dots) and LP02-like mode (higher series of dots) for a 50 μm core diameter hollow core fiber having the design of FIG. 1A.

Hollow core fibers are attractive for carrying high power light and/or high intensity light because the light has only limited interaction with the glass defining the waveguide, resulting in a high damage threshold. However, doping hollow fibers for optical gain can only be achieved by means of a gas medium.

Various waveguide designs, including hollow core designs, have been proposed and tested in the past, but the present inventors are not aware that any of these have yielded sufficient HOM suppression to substantially increase the TMI threshold.

SUMMARY

Embodiments of the present technology include an all solid hybrid waveguiding structure providing (i) large mode area, (ii) acceptable losses of the desired core mode and (iii) very high losses of the undesired next higher order mode in the core. Embodiments of the waveguide include a hybrid of low index barriers providing confinement by total internal reflection (TIR); and high index rings that support guided modes only at effective indices different from that of the desired core mode, providing confinement by an effect similar to that in all-solid photonic bandgap (PBG) fibers. The effect of the rings differs from that of the PBG cladding in that (i) they do not fill the entire cladding and so provide imperfect confinement and (ii) they support poorly guided (lossy) modes that can be arranged to couple to and suppress the undesired HOMs. The wall thickness of the rings can be conveniently specified according to the anti-resonant reflection optical waveguide (ARROW) mechanism, as in negative curvature hollow core fibers. The resulting structure is compatible with rare earth doping of the core, and so is suitable for application to high power fiber amplifiers and lasers. The high HOM loss feature makes the present technology particularly relevant to suppression of transverse model instability (TMI) in fiber amplifiers.

Exemplary applications for the present technology generally include uses in large, effectively single mode fibers. It is especially useful in high power fiber amplifiers and for suppression of TMI in high power fiber amplifiers.

BRIEF DESCRIPTION OF THE DRAWINGS

The accompanying drawings, which are incorporated into and form a part of the present disclosure, illustrate embodiments of the technology and, together with the description, serve to explain the principles of the technology.

FIG. 3A illustrates a low contrast design that has 5 nested rings, each having an outer diameter ($D_{ring}$) of 23 μm.

DETAILED DESCRIPTION OF THE TECHNOLOGY

This technology relates to a basic design for solid optical fibers with features that are beneficial to high power rare-earth doped fiber lasers and amplifiers. The design derives from a prior art design for hollow optical fibers, the so-called negative curvature hollow core fiber discussed above. As noted, these fibers do not support true bound modes in the core. The present technology also achieves core confinement by utilizing a convenient ARROW design rule (constraint) on the ring wall at the operating wavelength λ to obtain minimum losses in the core:

$2tNA = (m + \frac{1}{2})\lambda$ $NA = \sqrt{n_{ring}^2 - n_{bg}^2}$

Here, t is the ring wall thickness, m represents an integer, and the ring material is specified by NA, a function of its index of refraction $n_{ring}$ and that of the background $n_{bg}$. For a hollow fiber, $n_{bg}=1$. Note that in the context of the present technology, the term "ring" refers to an outer ring of material of a solid strand of glass, where the outer ring's index is different from that of material adjacent to the inner boundary of the ring.

The first part of the present technology is the application of the negative curvature hollow core fiber design to solid doped amplifier fibers. In the present technology, the core is not hollow but comprises a region of rare-earth doped glass of index $n_{core}$, while the rings are composed of a glass having an outer ring doped with a material (typically Germanium (Ge)) that raises its index to $n_{ring}$. All other background regions are of undoped glass having index $n_{bg}$. The core may be co-doped with material (typically Fluorine (F)) to reduce its index to that of the undoped glass, i.e., $n_{core} = n_{bg}$.

Figure 1A:
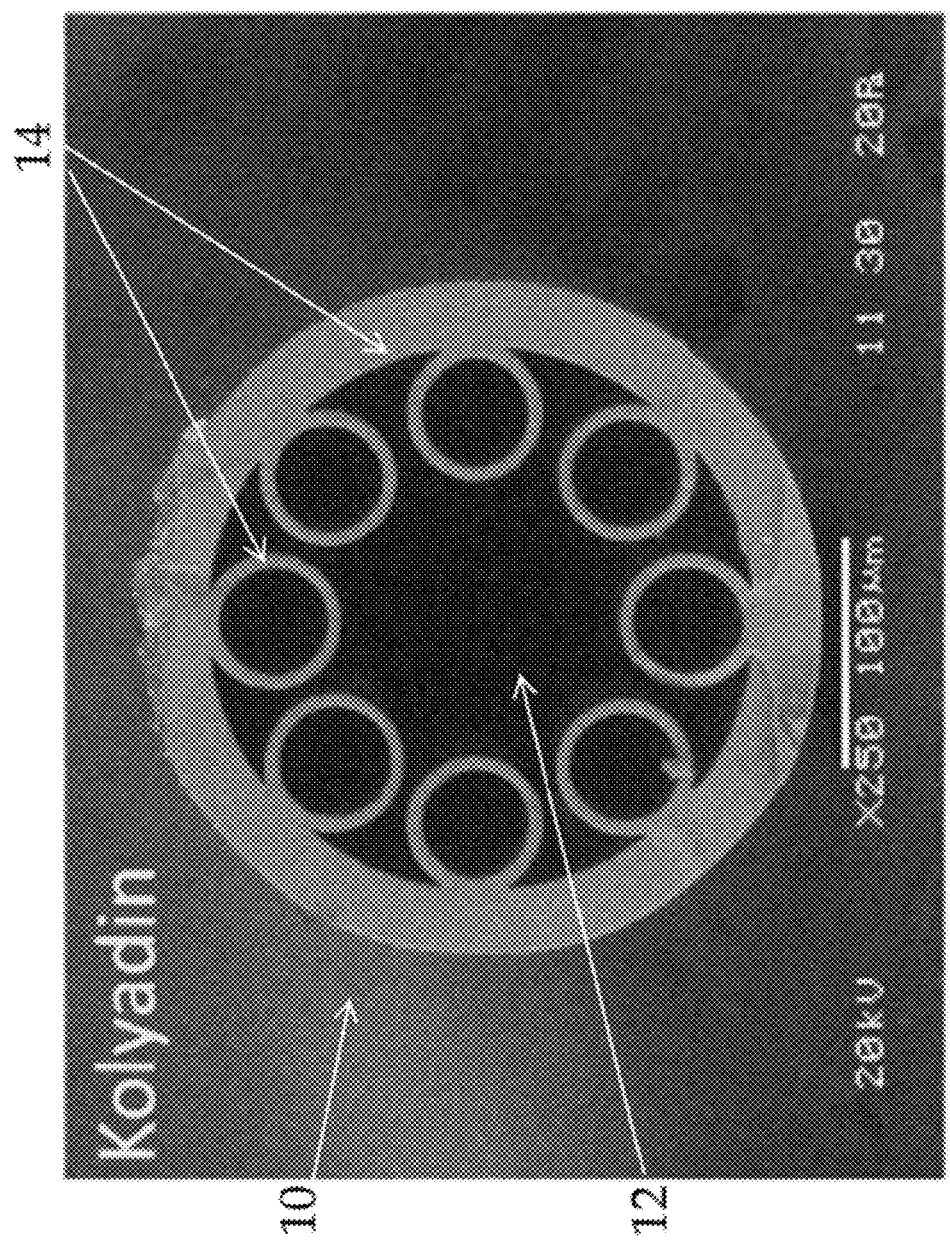
FIG. 1A shows a prior art hollow fiber structure with a core diameter of 120 μm.
Figure 1B:
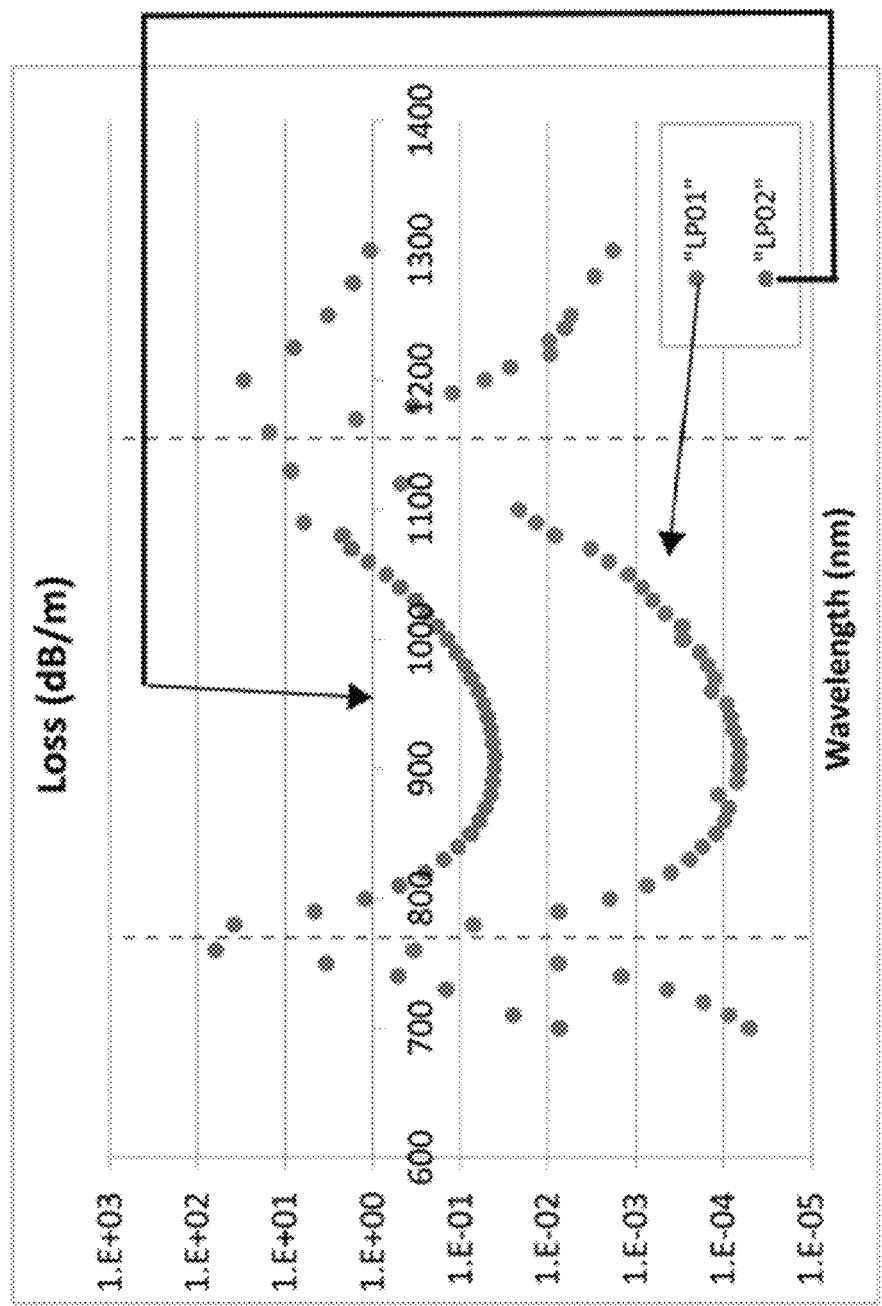
FIG. 1B shows the calculated losses vs wavelength for a representative 50 μm core diameter hollow core fiber according to the design of FIG. 1A.
Figure 2A:
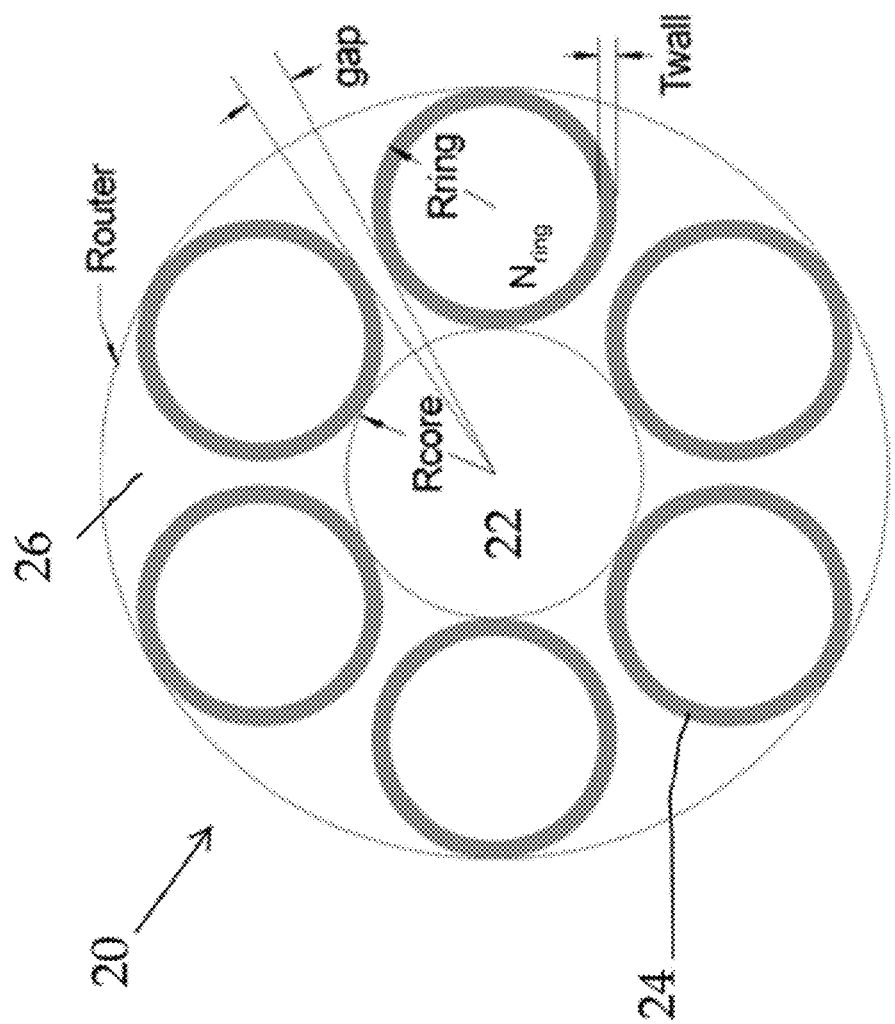
FIG. 2A shows the geometry for a six-ring design of the present technology, along with its required parameters.

Embodiments of the present technology provide large core fiber designs that satisfy the ARROW condition and are consistent with a core doping level sufficient to be useful in high power fiber amplifiers. FIG. 2A shows the geometry for a six-ring fiber 20 design according to the present technology, along with the required specification parameters. For simplicity of explanation, core 22 is shown an having a boundary at the core radius $R_{core}$ but the boundary is for explanation only. Rings 24 are shown to have a doped wall thickness $T_{wall}$ and a radius $R_{ring}$. Core 22 and rings 24 are located within background material 26

In an original point design, the propagation loss of the desired mode is non-zero but small enough to be acceptable. However, the propagation loss of the higher order modes (HOMs) is significantly higher than the lowest mode, such that the fiber can be considered to operate in a single transverse mode. In fact, the HOM losses are high enough to be considered as a means of mitigating transverse modal instability (TMI), currently a limiting nonlinear effect in high power fiber amplifiers. TMI is brought on by a nonlinear coupling between the preferred mode and the HOMs; an accepted rule of thumb is that HOM loss of ~40 dB/m at the operating temperature is enough to suppress TMI.

Figure 2B:
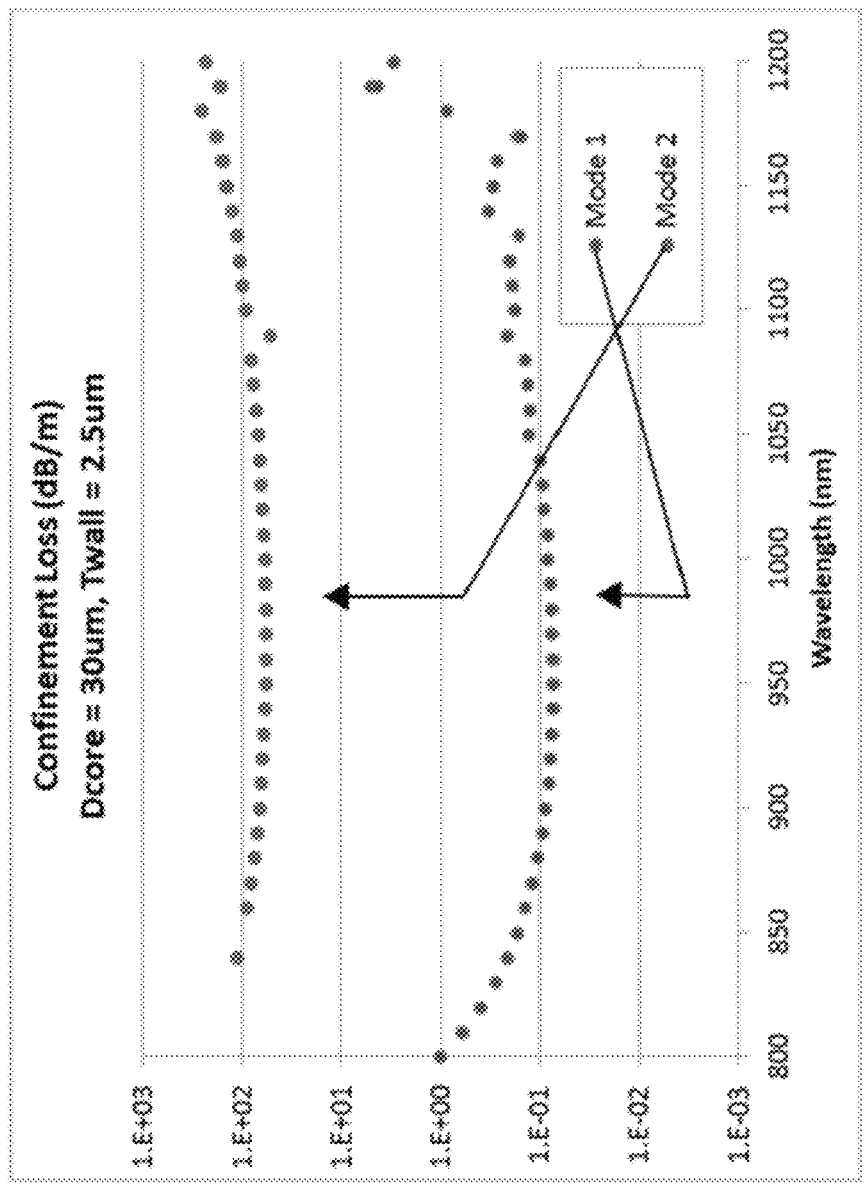
FIG. 2B shows confinement loss versus wavelength for the design of FIG. 2A.
Figure 2C:
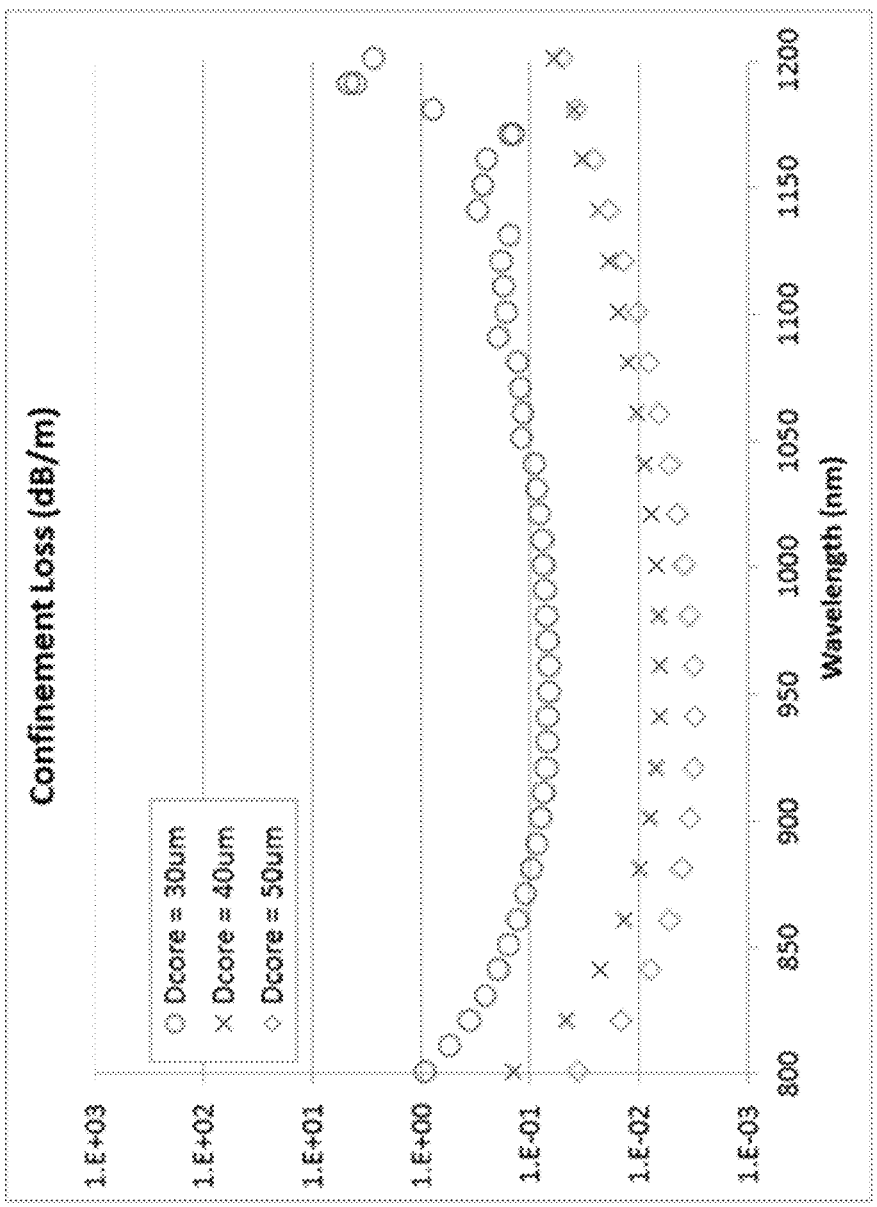
FIG. 2C shows the confinement loss for the fundamental mode at various values of $D_{core}$.
Figure 2D:
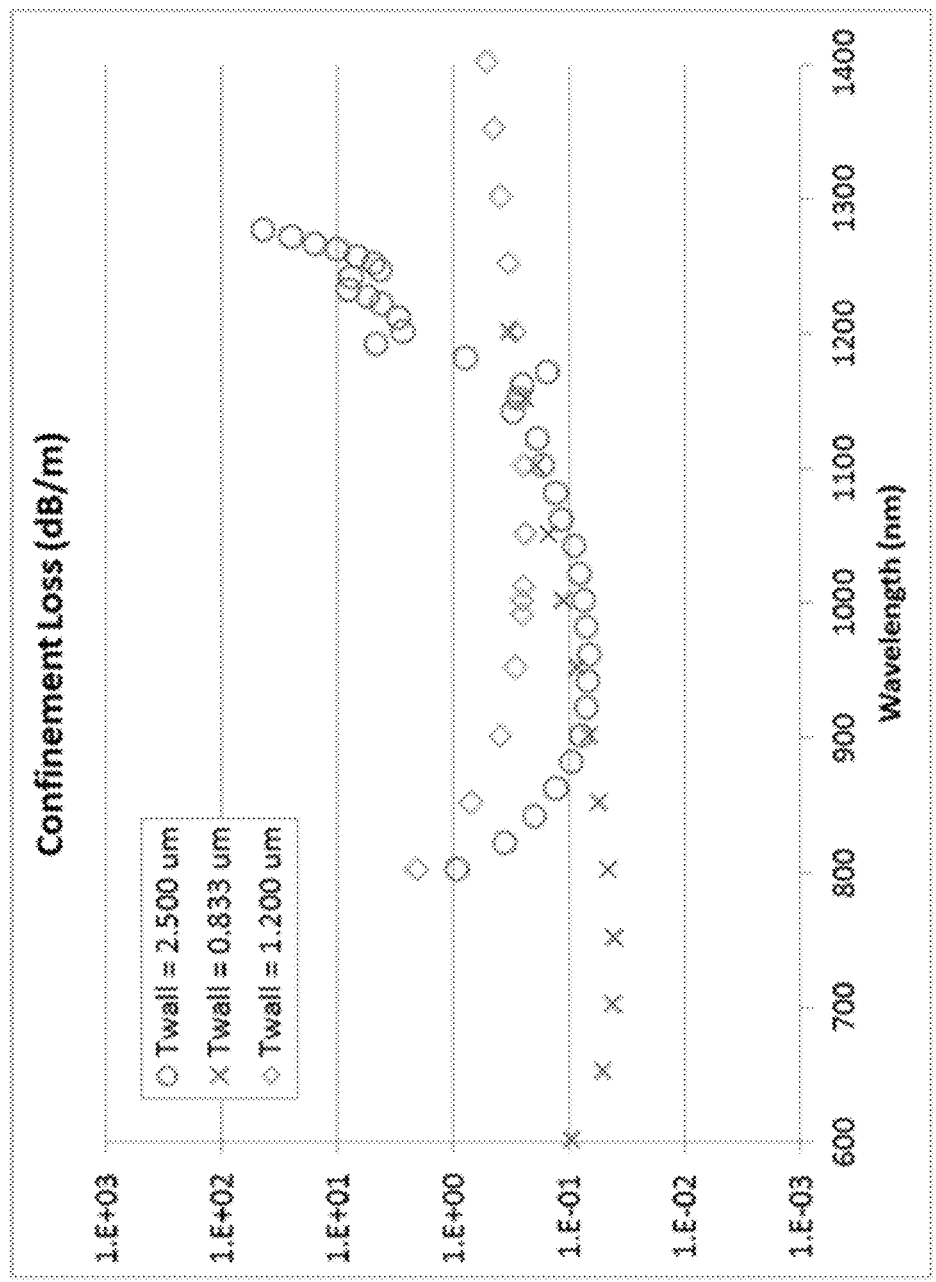
FIG. 2D shows confinement loss for various ring wall thicknesses.
Figure 2E:
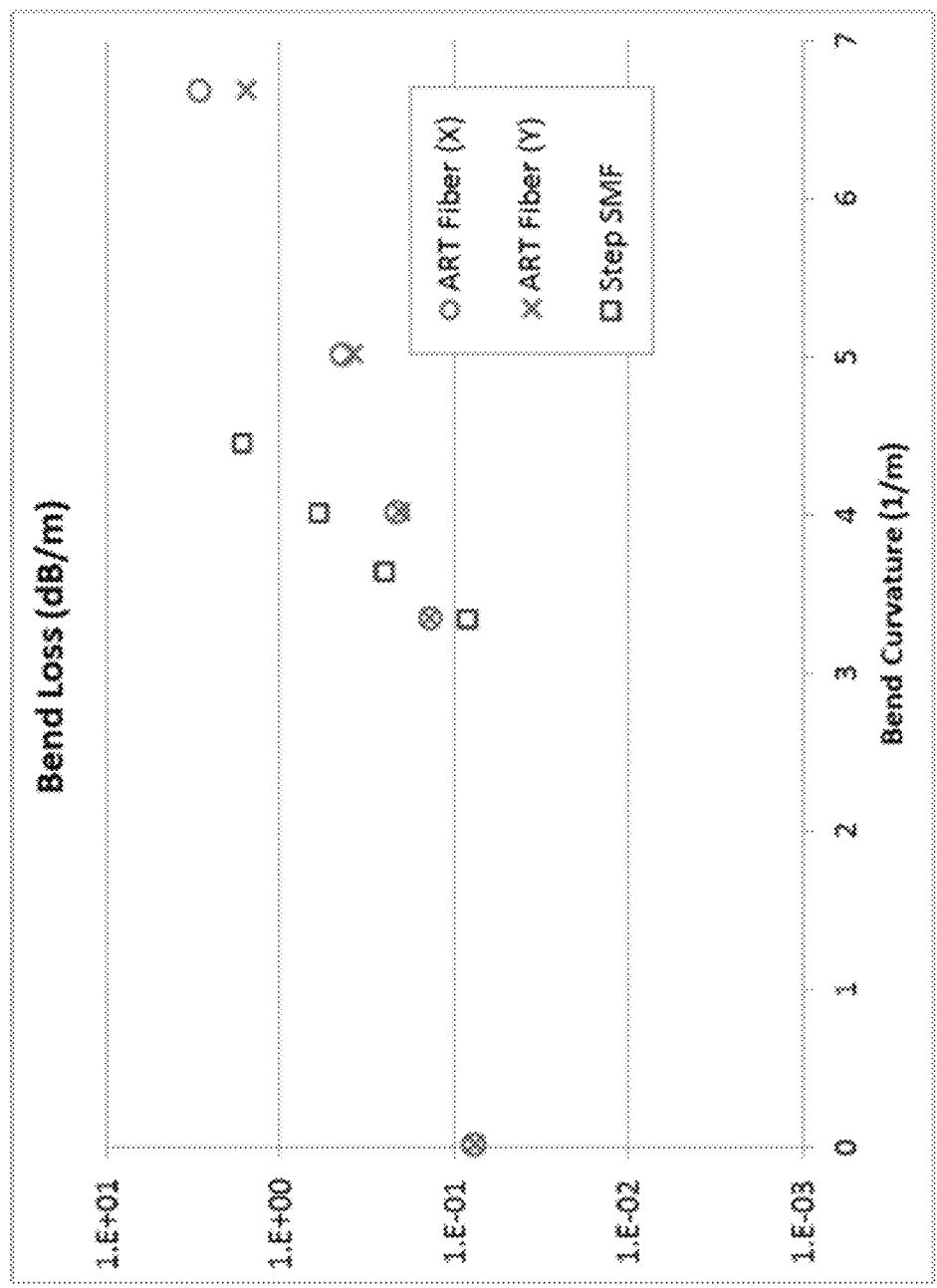
FIG. 2E compares bend loss for the point design anti-resonant tube fiber (ART) in both the x and y directions to a step fiber with equivalent core size.

With reference to FIG. 2A, the design parameters for the original point design are $R_{core}=15$ μm (thus $D_{core}=30$ μm), $R_{ring}=12.47$ μm, $T_{wall}=2.5$ μm, $N_{clad}=1.45$, $NA_{ring}=0.3$ ($N_{del}=3.07 \times 10^{-2}$) and number of rings=6 with a relative angular gap between rings of 0.1. Note that the index of any element other than the core or the ring wall is the background index, or Ndel=0. FIG. 2B shows confinement loss versus wavelength for this design. The loss at 1 μm for the fundamental mode (LP01-like) is 0.08 db/m. The loss at 1 μm for the first higher order mode (LP11-like) is 58 db/m. Yet higher order modes (e.g., LP21-like and LP02-like) can also propagate, but their high losses and large effective index difference from the 'LP01' mode makes them of less concern with respect to TMI. FIG. 2C shows the confinement loss for the fundamental mode at various values of $D_{core}$. It can be seen that larger cores have lower fundamental mode loss. FIG. 2D shows confinement loss for various ring wall thicknesses. It can be seen that changing the wall thickness does not appreciably alter the confinement loss. FIG. 2E compares bend loss for the point design anti-resonant tube fiber (ART) in both the x and y directions to a step fiber with equivalent core size. It can be seen the loss is generally less for the ART fiber.

To accommodate various glass fabrication technologies, a design was developed with reduced the ring contrast while adjusting the ring wall thickness to satisfy the ARROW condition; however, this resulted in an unacceptably high loss for the preferred mode. The design efforts were broadened to include variations on the core size, number of rings and their spacing, multilayer ring structures, and departures from the ARROW condition; all with the goal of reducing the propagation loss of the preferred mode.

Figure 3B:
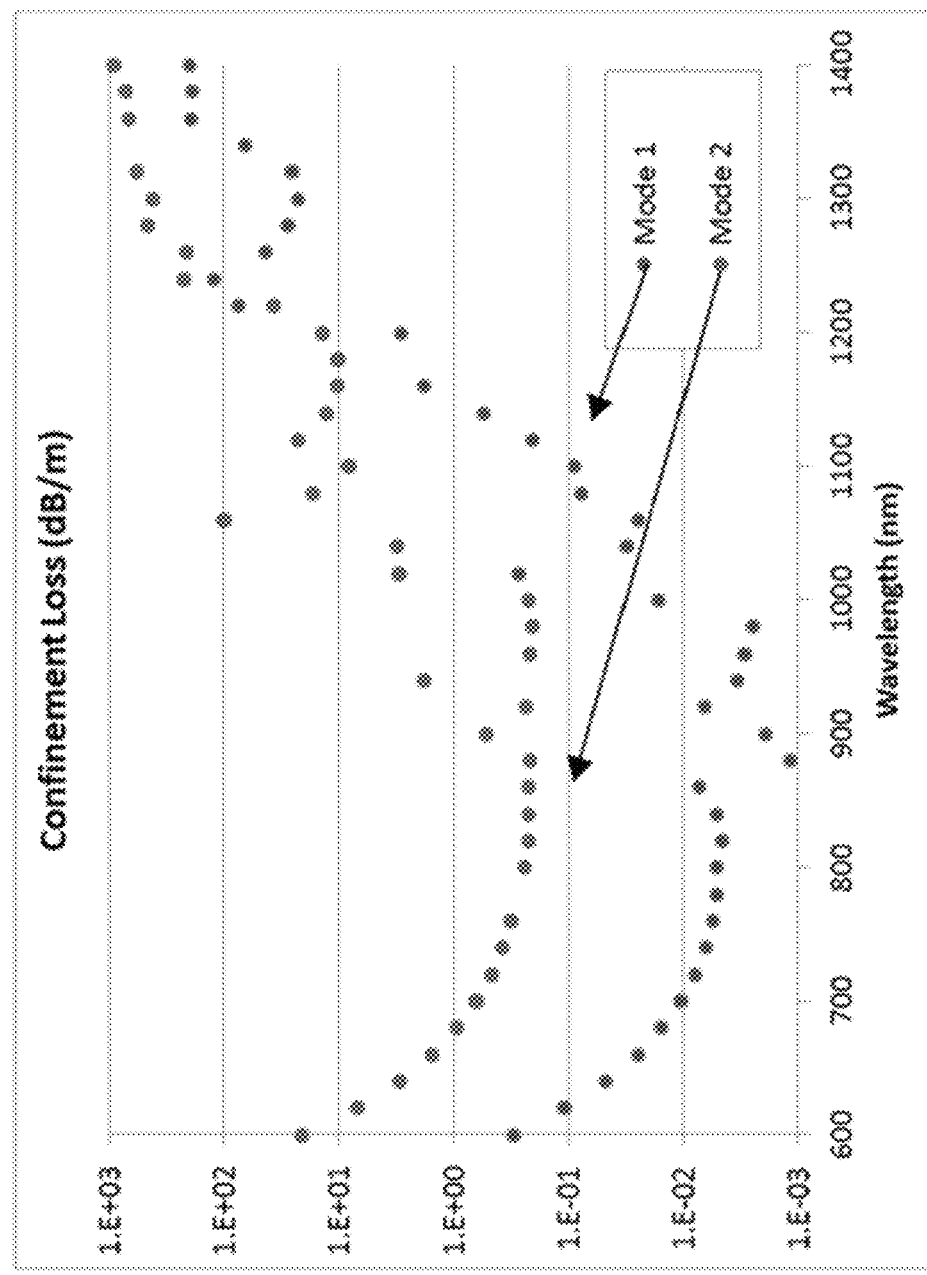
FIG. 3B shows confinement loss versus wavelength for mode 1 (lower series of dots) and for mode 2 (upper series of dots).

One low contrast design, illustrated in FIG. 3A as fiber 30, has 5 nested rings 31-35, each having an outer diameter ($D_{ring}$) of 23 μm. Rings 31-35 surround core 36. The FIG. 3B shows confinement loss versus wavelength for mode 1 (lower series of dots) and for mode 2 (upper series of dots). This design has a reduced fundamental mode loss but has lower mode discrimination. In this example, all nested rings are of the same material as in the non-nested case. The other material of the nested ring elements is the same as the background material.

Figure 4:
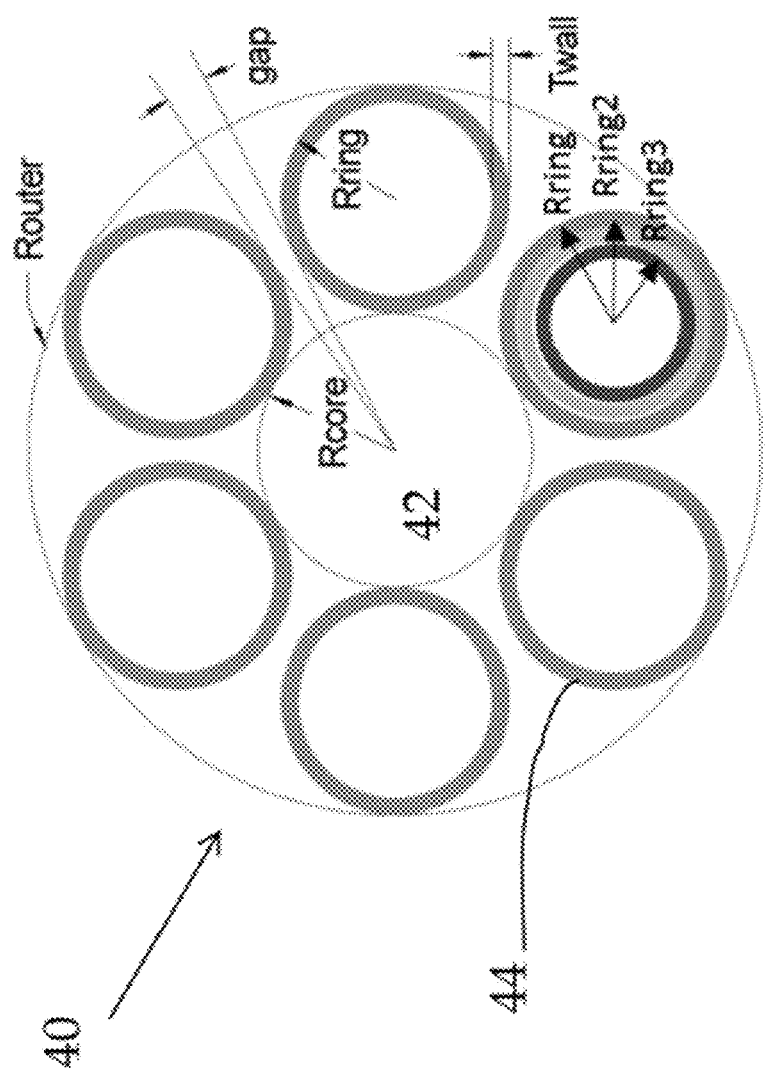
FIG. 4 illustrates a low contrast design of the present technology that utilizes an impedance matching strategy for the ring structures in an effort to decrease the fundamental mode loss and increase mode discrimination.

Another low contrast design, shown in FIG. 4, utilizes an impedance matching strategy for the ring structures in an effort to decrease the fundamental mode loss and increase mode discrimination. This figure shows a geometry that is similar to that of FIG. 2A as having a six-ring fiber 40 design, along with the required specification parameters. For simplicity of explanation again, core 42 is shown as having a boundary at the core radius $R_{core}$ but the boundary is for explanation only. Rings 44 are shown to have a wall thickness Tu and a radius $R_{ring}$. The rings all include a nested ring configuration, but for explanation purposes, only one ring shows a three-element construction comprises radiuses $R_{ring}$, $R_{ring\,2}$ and $R_{ring\,3}$. The material in the center of the ring is the same as the background. Specific values of the indices of rings 1-3 can be chosen to achieve a desired ratio of the values of the fields inside and outside the compound ring.

Figure 5:
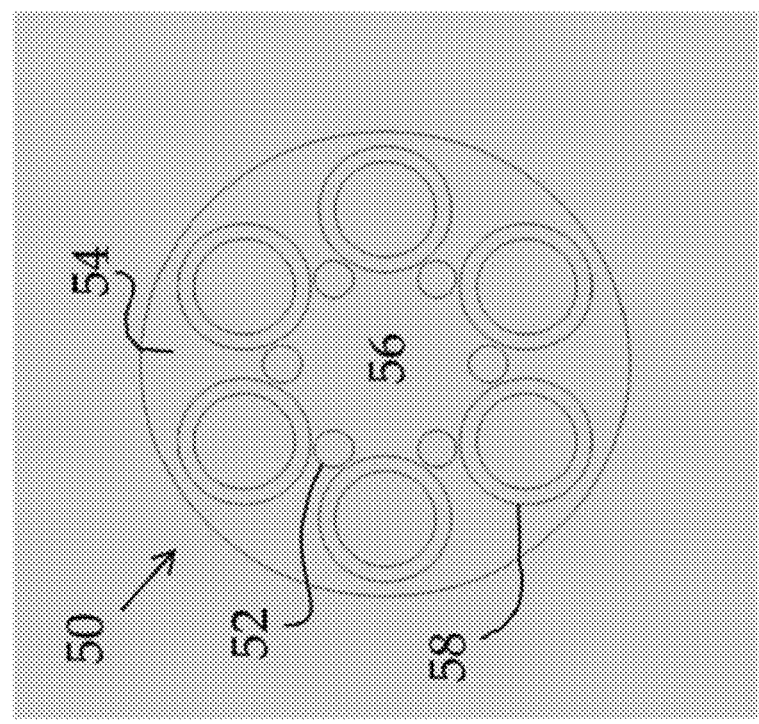
FIG. 5 illustrates an exemplary low contrast variation that includes added auxiliary elements with an index below that of the background glass.

Faced with unacceptable losses in the desired mode, the confinement due to the ARROW mechanism was augmented with the mechanism of total internal reflection, which is the basis of the robust guidance in traditional dielectric waveguides and fibers. As shown in FIG. 5, additional auxiliary elements (barriers) 52 were introduced into fiber 50. The auxiliary elements have an index $n_{barrier}$ below that of the background glass 54. In some embodiments, the core 56 is rare earth doped and comprises an index that is higher than the barriers 52. Thus, FIG. 5 illustrates a cross-sectional view of an exemplary low contrast variation that includes such auxiliary elements. The rings 58 have a relatively increased index compared to the smaller inner barriers (auxiliary elements 52). The small inner barriers (solid circles) 52 have a relatively decreased index compared to the core 56, the background 54 and the rings 58.

Figure 6A:
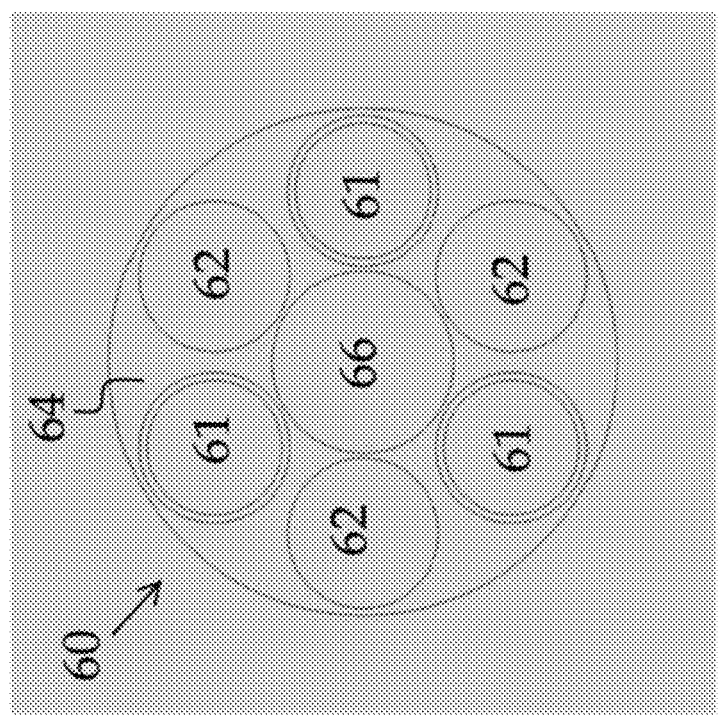
FIG. 6A illustrates a fiber design that replaces some of the rings with such auxiliary elements with an index $n_{barrier}$ below that of the background glass.

Another alternative is to replace one or more of the rings with low index barrier elements. Thus, FIG. 6A illustrates a fiber 60 design that replaces some of the rings 61 with such auxiliary elements 62 with an index $n_{barrier}$ below that of the background glass 64. Rings 61 and auxiliary elements 62 surround core 66. In the figure, the circles 62 represent the low index barriers. Such an arrangement could substantially reduce the propagation loss of a preferred mode to a level acceptable in a fiber amplifier.

While investigating this hybrid structure, attention was placed on decreasing the propagation loss of the preferred mode. But as an exceptionally important side benefit, the fundamental mechanism underlying the enhanced losses of the HOM was discovered (recall that this enhanced loss is crucial for mitigation of TMI). That mechanism is the coupling of the unwanted HOM in the core to a mode supported within the solid material interior to the rings. These ring modes are analogous to those of the core, but are bounded by a concentric circle instead of the "Negative Curvature" boundary of the core. That difference in boundaries leads to drastically higher propagation losses for the ring modes, and therefore any core mode that couples to the ring.

This coupling requires that the mode(s) involved be resonant, making it sensitive to the size of the rings. It was calculated that by judicious design of the rings, HOM losses can be made high enough, >~150 dB/m, before considering the heat load present in active fiber amplifiers, to suppress TMI. Thus, replacing some rings with down-doped "barrier" features reduced loss of the desired mode; while tuning of the "ring modes" can lead to high loss for the HOM, i.e., high mode discrimination.

Figure 6B:
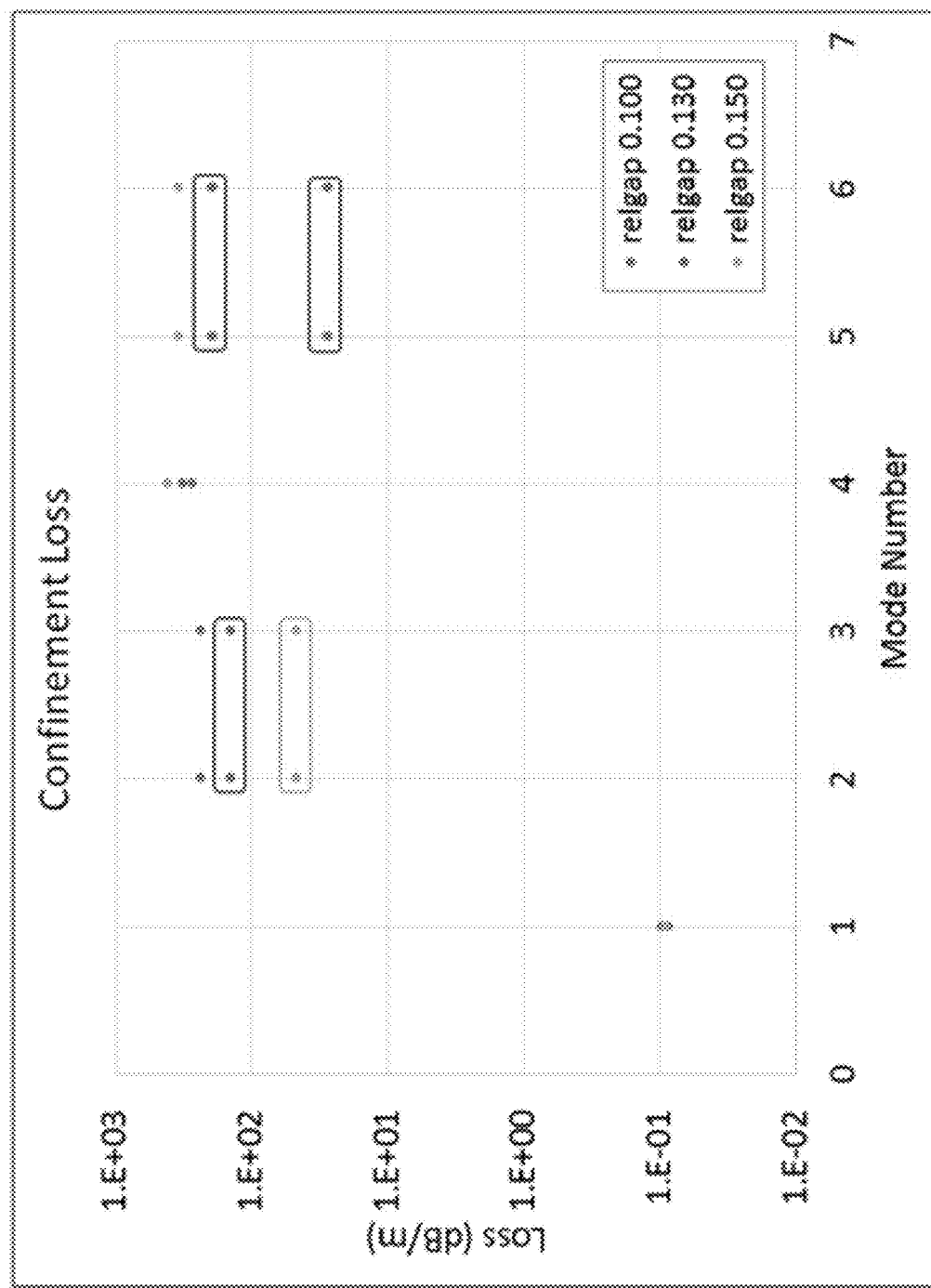
FIG. 6B shows confinement loss for the fundamental mode and the relevant next higher order modes, for different sizes of the rings (parameterized by the 'relgap').

FIG. 6B shows confinement loss for the fundamental mode and the relevant next higher order modes, for different sizes of the rings (parameterized by the 'relgap'). Depending on relgap, some subset of the higher order modes has undesirably low loss; while for relgap=0.13, all of these modes have desirably high loss. The term "relgap" refers to the relevant next higher order mode.

Figure 6C:
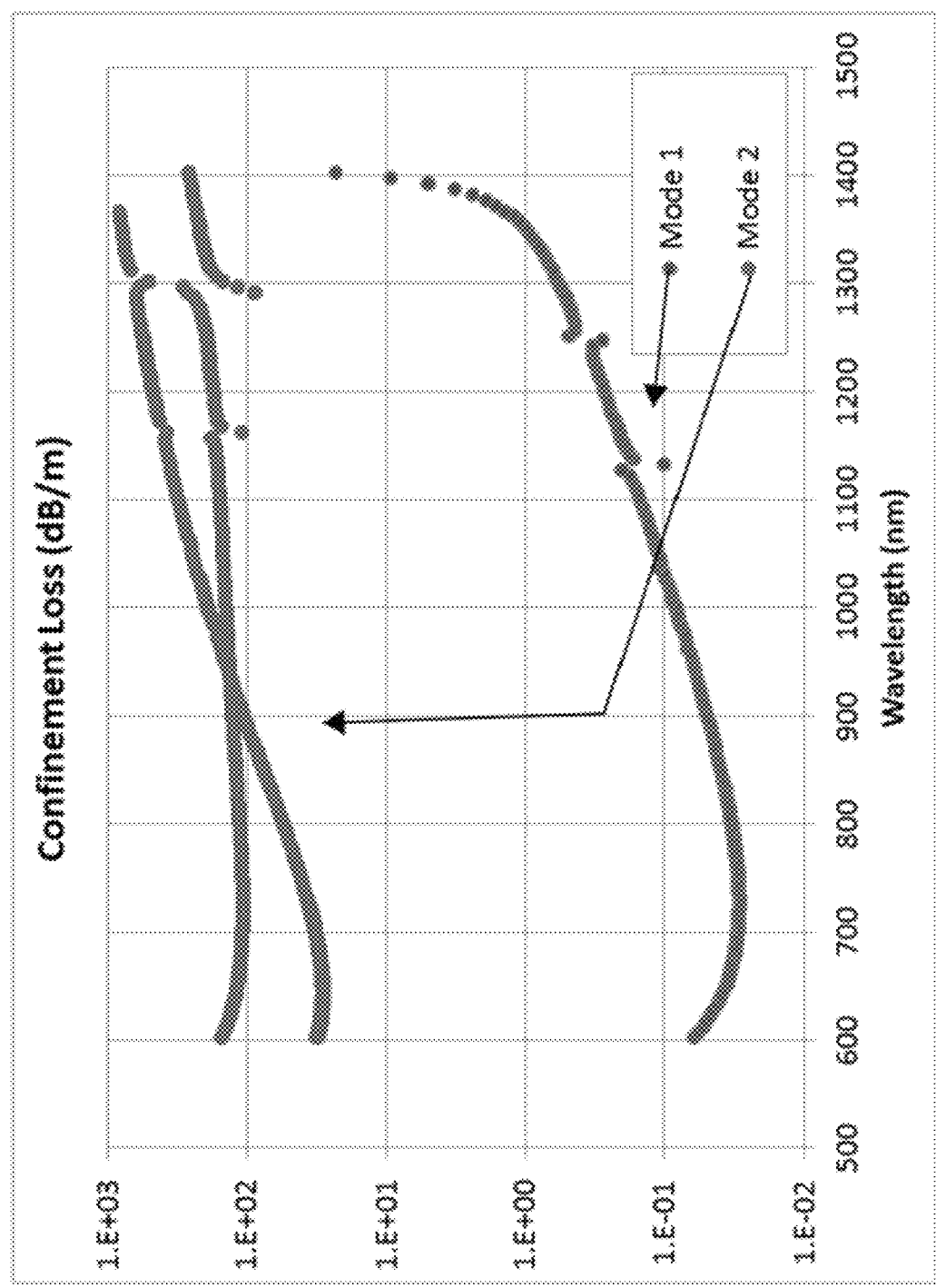
FIG. 6C shows the confinement loss vs wavelength for the fundamental mode ('LP01', mode 1) and relevant higher order modes ('LP11', mode 2) for the relgap=0.13 case.

FIG. 6C shows the confinement loss vs wavelength for the fundamental mode ('LP01', mode 1) and relevant higher order modes ('LP11', mode 2) for the relgap=0.13 case. Losses vary with wavelength, but in the region of interest the 'LP01' mode has a loss of ~0.1 db/m and the 'LP11' mode has a loss of ~150 db/m. The two branches of the 'LP11' mode loss are due to the two parities with which those modes can couple to the rings (see also FIG. 6D).

Figure 6D:
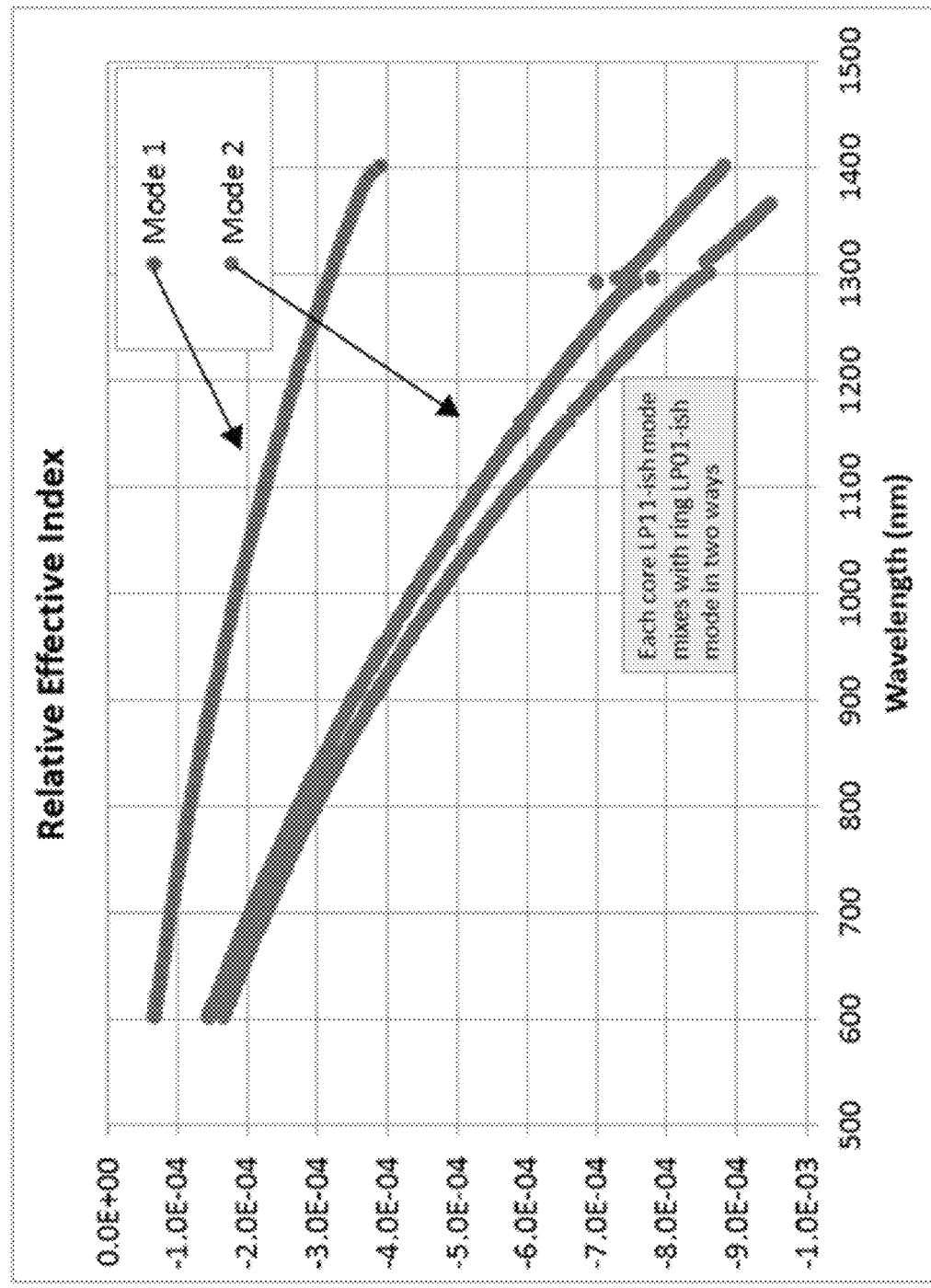
FIG. 6D shows the effective indices vs wavelength of the fundamental mode ('LP01', mode 1) and relevant higher order modes ('LP11', mode 2).

FIG. 6D shows the effective indices vs wavelength of the fundamental mode ('LP01', mode 1) and relevant higher order modes ('LP11', mode 2). The two branches of the 'LP11' mode index are due to the two parities with which those modes can couple to the rings (see also FIG. 6B).

Simulations concerning a heat loaded (25 W/m) fiber utilizing low contrast rings with barriers were performed, consistent with quantum defect heating in a 20 m fiber at 5 kW. Heating induces a change in the material index, increasing guidance and shifting the effective indices of the modes. In particular, these shifts separate the core 'LP11' and ring 'LP01' modes in the optimized cold design, resulting in a reduced core 'LP11' loss of ~30 dB/m. Adjusting the ring diameter ONLY, via adjustment of relative gap from 0.13 to 0.115, results in a core 'LP1' loss of >~140 dB/m.

Figure 6E:
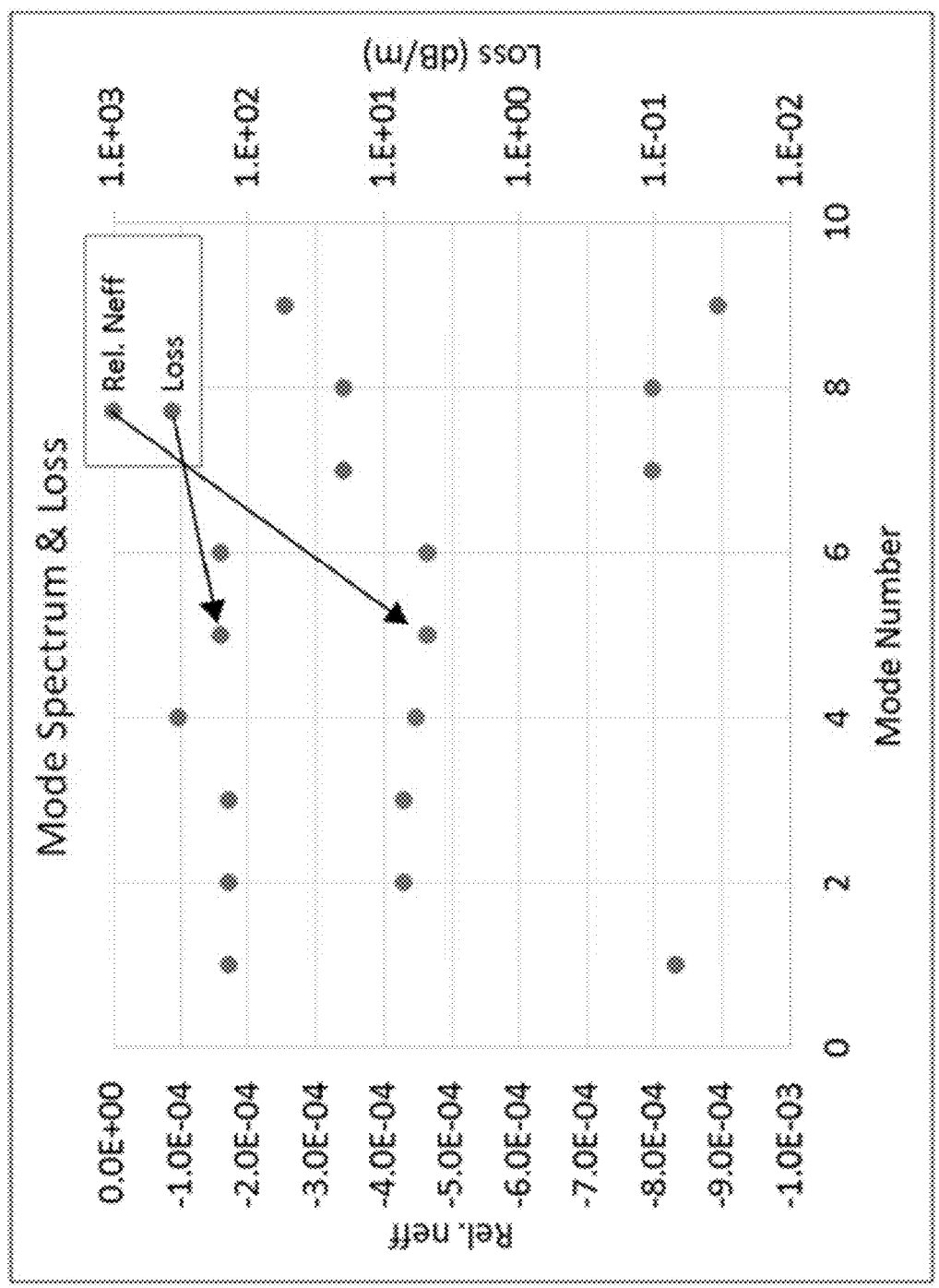
FIG. 6E shows effective index and confinement loss in the heated fiber after adjustment of the ring diameter.

FIG. 6E shows effective index and confinement loss in the heated fiber after adjustment of the ring diameter. The heat induced index change results in yet higher order modes ('LP21' and 'LP02') to propagate. However, their losses and especially their large effective index difference with respect to the 'LP01' mode make them less of a concern with respect to TMI.

The following design parameters and specifications are provided for an embodiment having low contrast rings with barriers:

Design parameters
    Barriers replace rings, $R_{barrier}=R_{ring}$
    For cold fiber case
        $N_{clad}=1.45$, $R_{core}=15$ μm
        Number of rings=6, relative gap=0.13
        $R_{ring}=11.783$ μm, $T_{wall}=1.25$ μm
        $NA_{ring}=0.2$ (Ndel=$1.37\times10^{-2}$)
        $NA_{barrier}=0.14$ (Ndel=$6.77\times10^{-3}$)
    For hot fiber case, 25 W/m heatload
        $N_{clad}=1.45$, $R_{core}15$ μm
        Number of rings=6, relative gap=0.115
        $R_{ring}=11.783$ μm, $T_{wall}=1.25$ μm
        $NA_{ring}=0.2$ (Ndel=$1.37\times10^{-2}$)
        $NA_{barrier}=0.14$ (Ndel=$-6.77\times10^{-3}$)

Broadly, this writing discloses at least the following.

An all solid hybrid waveguiding structure provides large mode area, acceptable losses of the desired core mode and very high losses of the undesired next higher order mode in the core. Embodiments of the waveguide include a hybrid of low index barriers providing confinement by total internal reflection, and further include high index rings that support guided modes only at effective indices different from that of the desired core mode.

This writing also presents at least the following Concepts.

Concepts:

1. An apparatus, comprising:
a length of a background material of undoped optical material having an index of refraction ($n_{bg}$);
a core comprising a length of a solid core material within said length of background material, wherein said core material comprises a rare-earth dopant and has an index of refraction ($n_{core}$); and a length of a first set of solid optical material elements located within said length of background material and distributed around said core, wherein each solid optical material element of said first set of solid optical material elements comprises an outer solid ring region having an index of refraction ($n_{ring}$) that is greater than $n_{bg}$.

2. The apparatus of concepts 1 and 3-15, wherein said undoped optical material comprises undoped glass.

3. The apparatus of concepts 1, 2 and 4-15, wherein each solid optical material element of said first set of solid optical material elements comprises a solid glass element.

4. The apparatus of concepts 1-3 and 5-15, wherein said first set of solid optical material elements are distributed around said core and curve away from said core.

5. The apparatus of concepts 1-4 and 6-15, wherein each solid optical material element of said first set of solid optical material elements comprises an outer wall, wherein light is partially confined to said core by glancing reflection from at least one said wall of said solid optical material elements.

6. The apparatus of concepts 1-5 and 7-15, wherein each solid optical material element of said first set of solid optical material elements comprises an outer wall, wherein light is partially confined to said core by glancing reflection from at least one said wall of said solid optical material elements, wherein said glancing reflection is enhanced for certain wavelengths by multiple reflections within said outer solid ring region of at least one solid optical material element of said first set of solid optical material elements.

7. The apparatus of concepts 1-6 and 8-15, wherein to obtain minimum losses in said solid core material at an operating wavelength λ, said each outer solid ring region is set such that $$2tNA=(m+\tfrac{1}{2})\lambda, \text{ wherein}$$

$$NA=\sqrt{n_{ring}^2-n_{bg}^2},$$

wherein t is the wall thickness of said each outer solid ring region, wherein said ring comprises a material specified by its numerical aperture NA which is a function of its index of refraction $n_{ring}$ and that of the background $n_{bg}$ and wherein m is an integer.

8. The apparatus of concepts 1-7 and 9-15, further comprising a length of a second set of optical material elements located within said background material and distributed around said core, wherein said second set of optical material elements comprises an index of refraction ($n_{barrier}$) below that of $n_{bg}$.

9. The apparatus of concepts 1-8 and 10-15, further comprising a length of a second set of optical material elements located within said background material and distributed around said core, wherein said second set of optical material elements comprises an index of refraction ($n_{barrier}$) below that of $n_{bg}$, wherein each optical material element of said second set of optical material elements comprises glass.

10. The apparatus of concepts 1-9 and 11-15, further comprising a length of a second set of optical material elements located within said background material and distributed around said core, wherein said second set of optical material elements comprises an index of refraction ($n_{barrier}$) below that of $n_{bg}$, wherein at least one solid optical material element of said first set of solid optical material elements has a diameter that tunes a mode of said outer solid ring region such that an unwanted higher order mode (HOM) in said core is coupled to a mode supported within the interior of said at least one solid optical material element of said first set of solid optical material elements.

11. The apparatus of concepts 1-10 and 12-15, further comprising a length of a second set of optical material elements located within said background material and distributed around said core, wherein said second set of optical material elements comprises an index of refraction ($n_{barrier}$) below that of $n_{bg}$, wherein each said outer solid ring region of said first set of solid optical material elements comprises a diameter that brings at least one of its interior modes into resonance with at least one higher order mode (HOM) of said core, and thereby increases the propagation loss of said at least one HOM.

12. The apparatus of concepts 1-11 and 13-15, wherein at least one solid optical material element of said first set of solid optical material elements has a diameter that tunes a mode of said outer solid ring region such that an unwanted higher order mode (HOM) in said core is coupled to a mode supported within the interior of at least one solid optical material element of said first set of solid optical material elements.

13. The apparatus of concepts 1-12, 14 and 15, wherein each said outer solid ring region of said first set of solid optical material elements comprises a diameter that brings at least one of its interior modes into resonance with at least one higher order mode (HOM) of said core, and thereby increases the propagation loss of said at least one HOM.

14. The apparatus of concepts 1-13 and 15, wherein said core is co-doped with material to reduce its index to that of said undoped optical material.

15. The apparatus of concepts 1-14, wherein said core is co-doped with Fluorine to reduce the index of said core to that of said undoped optical material.

All elements, parts and steps described herein are preferably included. It is to be understood that any of these elements, parts and steps may be replaced by other elements, parts and steps or deleted altogether as will be obvious to those skilled in the art.

The foregoing description of the technology has been presented for purposes of illustration and description and is not intended to be exhaustive or to limit the technology to the precise form disclosed. Many modifications and variations are possible in light of the above teaching. The embodiments disclosed were meant only to explain the principles of the technology and its practical application to thereby enable others skilled in the art to best use the technology in various embodiments and with various modifications suited to the particular use contemplated. The scope of the technology is to be defined by the following claims.

We claim:

1. An apparatus, comprising:
   a length of background material of undoped optical material having an index of refraction ($n_{bg}$);
   a core comprising a length of a solid core material within said length of background material, wherein said core material comprises a rare-earth dopant and has an index of refraction ($n_{core}$); and
   a length of a first set of solid optical material elements located within said length of background material and distributed around said core, wherein each solid optical material element of said first set of solid optical material elements comprises an outer solid ring region having an index of refraction ($n_{ring}$) that is greater than $n_{bg}$,
   wherein each solid optical material element of said first set of solid optical material elements comprises an outer wall, wherein light is partially confined to said core by glancing reflection from at least one said wall of said solid optical material elements.

2. The apparatus of claim 1, wherein said undoped optical material comprises undoped glass.

3. The apparatus of claim 1, wherein each solid optical material element of said first set of solid optical material elements comprises a solid glass element.

4. The apparatus of claim 1, wherein said first set of solid optical material elements are distributed around said core and curve away from said core.

5. The apparatus of claim 1, wherein said glancing reflection is enhanced for certain wavelengths by multiple reflections within said outer ring region of at least one solid optical material element of said first set of solid optical material elements.

6. The apparatus of claim 1, wherein to obtain minimum losses in said solid core material at an operating wavelength λ, said each outer solid ring region is set such that $$2tNA=(m+½)λ,$$

wherein $$NA=\sqrt{n_{ring}^2-n_{bg}^2}$$

wherein t is the wall thickness of said each outer solid ring region, wherein said ring comprises a material specified by its numerical aperture NA which is a function of its index of refraction $n_{ring}$ and that of the background $n_{bg}$ and wherein m is an integer.

7. The apparatus of claim 1, further comprising a length of a second set of optical material elements located within said background material and distributed around said core, wherein said second set of optical material elements comprises an index of refraction ($n_{barrier}$) below that of $n_{bg}$.

8. The apparatus of claim 1, wherein at least one solid optical material element of said first set of solid optical material elements has a diameter that tunes a mode of said outer solid ring region such that an unwanted higher order mode (HOM) in said core is coupled to a mode supported within the interior of at least one solid optical material element of said first set of solid optical material elements.

9. An apparatus, comprising:
  a length of background material of undoped optical material having an index of refraction ($n_{bg}$);
  a core comprising a length of a solid core material within said length of background material, wherein said core material comprises a rare-earth dopant and has an index of refraction ($n_{core}$); and
  a length of a first set of solid optical material elements located within said length of background material and distributed around said core, wherein each solid optical material element of said first set of solid optical material elements comprises an outer solid ring region having an index of refraction ($n_{ring}$) that is greater than $n_{bg}$,
  wherein each said outer solid ring region of said first set of solid optical material elements comprises a diameter that brings at least one of its interior modes into resonance with at least one higher order mode (HOM) of said core, and thereby increases the propagation loss of said at least one HOM.

10. An apparatus, comprising:
  a length of background material of undoped optical material having an index of refraction ($n_{bg}$);
  a core comprising a length of a solid core material within said length of background material, wherein said core material comprises a rare-earth dopant and has an index of refraction ($n_{core}$); and
  a length of a first set of solid optical material elements located within said length of background material and distributed around said core, wherein each solid optical material element of said first set of solid optical material elements comprises an outer solid ring region having an index of refraction ($n_{ring}$) that is greater than $n_{bg}$,
  wherein said core is co-doped with material to reduce its index to that of said undoped optical material.

11. The apparatus of claim 10, wherein said core is co-doped with Fluorine to reduce the index of said core to that of said undoped optical material.

12. An apparatus, comprising:
  a length of background material of undoped optical material having an index of refraction ($n_{bg}$);
  a core comprising a length of a solid core material within said length of background material, wherein said core material comprises a rare-earth dopant and has an index of refraction ($n_{core}$);
  a length of a first set of solid optical material elements located within said length of background material and distributed around said core, wherein each solid optical material element of said first set of solid optical material elements comprises an outer solid ring region having an index of refraction ($n_{ring}$) that is greater than $n_{bg}$; and
  a length of a second set of optical material elements located within said background material and distributed around said core, wherein said second set of optical material elements comprises an index of refraction ($n_{barrier}$) below that of $n_{bg}$.

13. The apparatus of claim 12, wherein each optical material element of said second set of optical material elements comprises glass.

14. The apparatus of claim 12, wherein at least one solid optical material element of said first set of solid optical material elements has a diameter that tunes a mode of said outer solid ring region such that an unwanted higher order mode (HOM) in said core is coupled to a mode supported within the interior of said at least one solid optical material element of said first set of solid optical material elements.

15. The apparatus of claim 12, wherein each said outer solid ring region of said first set of solid optical material elements comprises a diameter that brings at least one of its interior modes into resonance with at least one higher order mode (HOM) of said core, and thereby increases the propagation loss of said at least one HOM.

16. An apparatus, comprising:
  a length of background material of undoped optical material having an index of refraction ($n_{bg}$);
  a core comprising a length of a solid core material within said length of background material, wherein said core material comprises a rare-earth dopant and has an index of refraction ($n_{core}$); and
  a length of a first set of solid optical material elements located within said length of background material and distributed around said core, wherein each solid optical material element of said first set of solid optical material elements comprises an outer solid ring region having an index of refraction ($n_{ring}$) that is greater than $n_{bg}$, wherein at least one solid optical material element of said first set of solid optical material elements has a diameter that tunes a mode of said outer solid ring region such that an unwanted higher order mode (HOM) in said core is coupled to a mode supported within the interior of at least one solid optical material element of said first set of solid optical material elements.

* * * * *